United States Patent [19]
Shultz, Sr.
[11] 4,211,446
[45] Jul. 8, 1980

[54] SEAL PULLER

[76] Inventor: William E. Shultz, Sr., 442 W. St. Charles Rd., Villa Park, Ill. 60181

[21] Appl. No.: 946,352

[22] Filed: Sep. 27, 1978

[51] Int. Cl.[2] .............................................. B65G 7/12
[52] U.S. Cl. ...................................... 294/26; 254/131
[58] Field of Search ................. 294/26; 81/8.1, 9.1 R, 81/130 A, 140, 52, 35; 254/131, 133; 7/100

[56] References Cited

U.S. PATENT DOCUMENTS

| | | | |
|---|---|---|---|
| 1,542,503 | 6/1925 | Haidle | 294/26 |
| 3,005,651 | 10/1961 | Flaker | 294/26 |
| 3,026,091 | 3/1962 | Oaks | 254/131 |
| 3,120,701 | 2/1964 | Wilson | 254/131 |
| 3,908,438 | 9/1975 | Norden | 254/131 |

*Primary Examiner*—James B. Marbert
*Attorney, Agent, or Firm*—Trexler, Wolters, Bushnell & Fosse, Ltd.

[57] ABSTRACT

The disclosure relates to a tool for pulling and removing annular or ring-shaped seals from an automobile transmission housing or the like. The overall tool includes an elongated main section having a first end and a second end, with a bifurcated fitting of special design mounted at a second end. The novel fitting includes a pair of spaced apart projections, and a pivotal member mounted therebetween. The pivotal member has a first end which includes a hook structure and is mounted for pivotal movement between the bifurcated fitting projections at a pivot point intermediate the ends thereof. The pivotal member is arranged to pivot between a first position substantially perpendicular to the main section to allow engagement of the hook structure with the seal and a second position substantially in line with the main section to allow the hook structure to encompass or wrap around the seal and firmly and securely engage the seal, with the pivotal member then adapted to be locked in place preparatory to the pulling of the seal. In addition, the pivotal member is comprised of a plurality of similar shaped segments mounted for articulated movement. Preferably three such segments are employed, with the outer segments fixed and the inner segment free to move slightly with respect to the outer segments. Accordingly, due to this segmented, articulated design, the pivotal member will conform to the surfaces encountered in engaging and using the tool to effect removal of a seal.

31 Claims, 12 Drawing Figures

FIG. 5
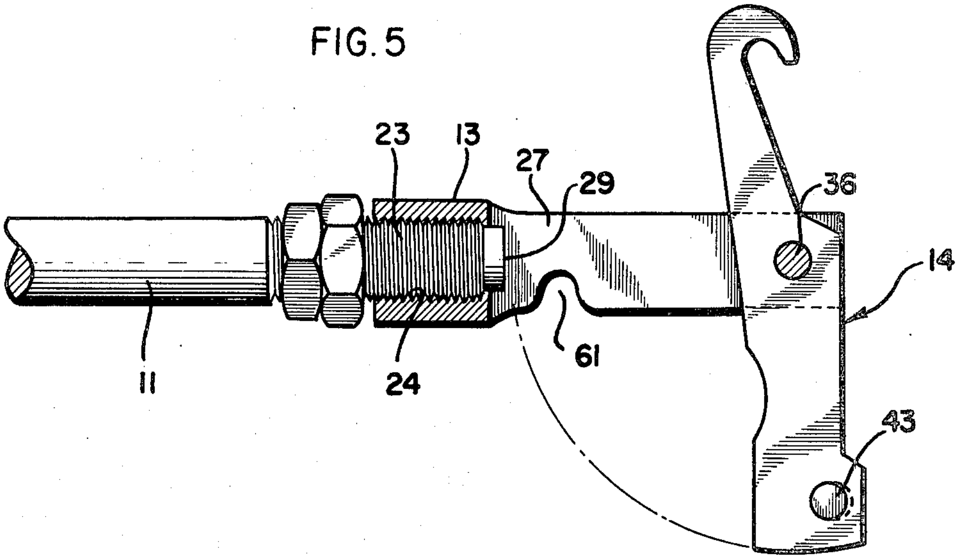
FIG. 6
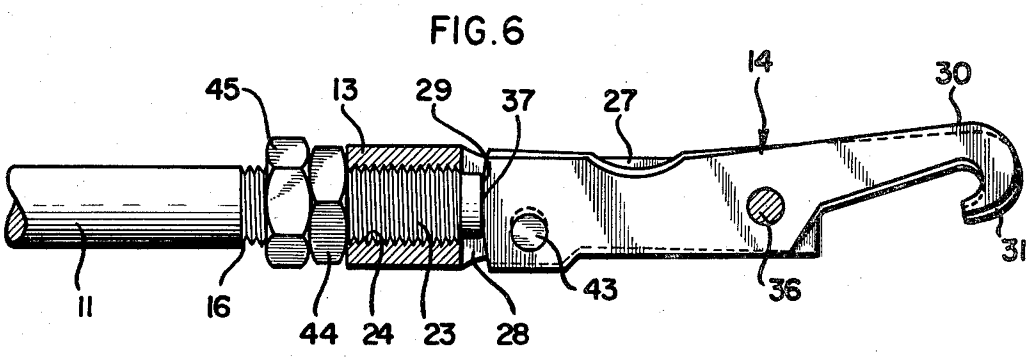
FIG. 8
FIG. 7
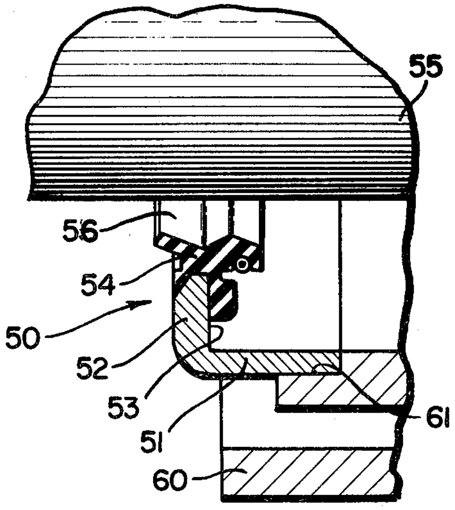
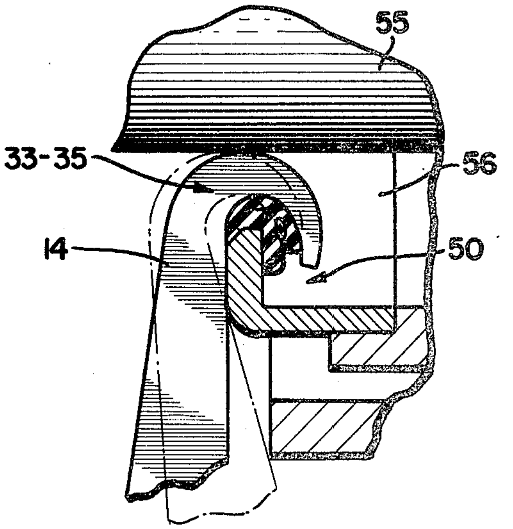

SEAL PULLER

BACKGROUND OF THE INVENTION

The invention relates in general to a seal pulling and removing tool and more particularly to a tool and accessory for pulling and removing ring-shaped seals from, for example, an automobile transmission housing.

Very often, when automobile transmissions are being repaired, it is necessary to remove the ring-shaped seal which provides the fluid seal between the transmission drive shaft and the transmission housing. Generally, the transmission seal comprises an annular metallic housing formed from relatively thin sheet metal and having a circumferential inwardly turned flange. A resilient, elastomeric ring seal member circumscribes the flange and provides fluid confinement as well as protection to the internal parts of the transmission from dirt and other dilaterious substances.

When removing seals of this type, it is necessary to firmly engage the inner surface of the inwardly turned housing flange and exert a force on the housing in a direction substantially along the axis of the transmission shaft. That is not an easy task because the seals are initially engaged with an interference fit, and further after years of use, tend to become corroded and even more difficult to remove. Also, it is necessary for the mechanic to work under the automobile and within the confines of the chassis, whether the automobile is raised or lowered, as such it is difficult for the mechanic to fine room to work or to get proper leverage for pulling the seals.

Tools of the prior art for pulling ring-shaped seals have not been entirely successful. Prior art tools have generally included an elongate member attachable to a slide hammer or the like, with said member having a hook shaped portion at one end. The hook portion is relatively narrow with a pointed hook tip or a narrow hook end surface. In order to initially engage such a tool, it is necessary to insert the hook between the shaft and the seal flange with the hook disposed 90° from its normal operating position. That is to say, the tool must be turned so that the hook is disposed generally tangential to the shaft wherein it may pass through the space between the seal and the shaft interiorly of the seal housing. Once inserted, the hook must then be rotated 90° to a generally radial position to bring the hook into engagement with the inner surface of the inwardly turned flange. Because the hook portion must be relatively thin to pass between the shaft and the inwardly turned flange, these prior art tools produce localized, high unit stress which tend to rupture the metal seal. All too often fragments of metal, rubber or of the retention spring can fall into the transmission, causing problems in the future due to fouling of the transmission pump or fluid lines. Prior tools are also difficult to use because they do not provide secure engagement with the seal and are inflexible and not adjustable so as to adapt to the particular work position required of the mechanic.

It is therefore a general object of the present invention to provide a new and improved tool for pulling and removing ring-shaped seals from, for example, the transmission housing of an automobile. It is a more particular object of the present invention to provide a seal pulling tool having a hook shaped portion at one end with the hook portion having a relatively broad end face surface to distribute the load and prevent the hook from rupturing the seal housing.

It is a still more particular object of the present invention to provide such a seal pulling tool wherein the hook shaped portion is pivotal to allow the hook to wrap around the seal flange to make a borad end surface contact and secure engagement with the seal possible.

It is a more particular object of the present invention to provide such a seal pulling tool wherein the hook end portion as provided by a plurality of articulated segments which will conform to the arcuate shape of the seal or the shaft thereby assisting initial position of the tool and providing firm and secure engagement between the hook and the seal.

It is a further object of the present invention to provide a tool accessory which may be applied to a common tool shaft to provide an improved seal pulling tool.

The embodiment of the invention illustrated and to be described provides a tool for pulling and removing ring-shaped seals from an automobile transmission housing or the like. The tool contemplated comprises an elongated main or handle section having first and second ends, grip means at said first end affording holding of the tool by an operator, and an end member pivotally mounted to a second end. The end member may be carried by a section of the tool integral with the main section, or as will be described with respect to the drawings, the end member may be part of an accessory mountable to an elongate main or handle section. In either arrangement the end member includes a hook means at one end thereof, with said end member adapted to pivot with respect to the main or handle section from a first position substantially transverse to the main section to a second position substantially in line with the main section. The pivotal movement of the end member afforded by the present invention provides means by which hook means having a substantial width may engage the seal when the end member is in the first position and wrap around the seal as the end member is pivoted from the first position to the second position. The end member is then locked in said second position, such that upon the application of an impact to the main or handle section, a force will be transmitted to the seal in a direction tending to unseat the seal housing.

As to the tool accessory mentioned above and adapted to be mounted at the end of an elongated shaft or handle extension to provide the overall tool construction, said tool accessory includes a bifurcated fitting adapted to be mounted to the shaft extension and having a pair of spaced apart arms or extensions with the pivotally mounted end member carried between the extensions. The pivotal end member of either contemplated arrangement, advantageously may be fabricated from a plurality of similar shaped segments, with relative movement poovided between certain of the segments to facilitate use and positioning of the took, as will be explained more fully hereinafter.

BRIEF DESCRIPTION OF THE DRAWINGS

The invention, together with its further advantages and objects thereof, may best be understood by making reference to the following description taken in conjunction with the accompanying drawings, wherein the several figures of which like reference numerals identify like elements, and wherein:

FIG. 5 is a partial side view, partially in cross-section, of one end of the seal pulling tool of FIG. 1 illustrating the tool in a first operating position;

FIG. 6 is a partial side view similar to FIG. 5 but illustrating the tool in a second operating position;

FIG. 7 is a partial side view, partially in cross-section, of a typical ring-shaped seal carried by a housing and disposable about a shaft;

FIGS. 8–10 are partial side views similar to FIG. 7 illustrating in sequential steps the operation of the tool of FIG. 1 to effect removal of the seal from the housing;

DESCRIPTION OF THE PREFERRED EMBODIMENT

Figure 1:
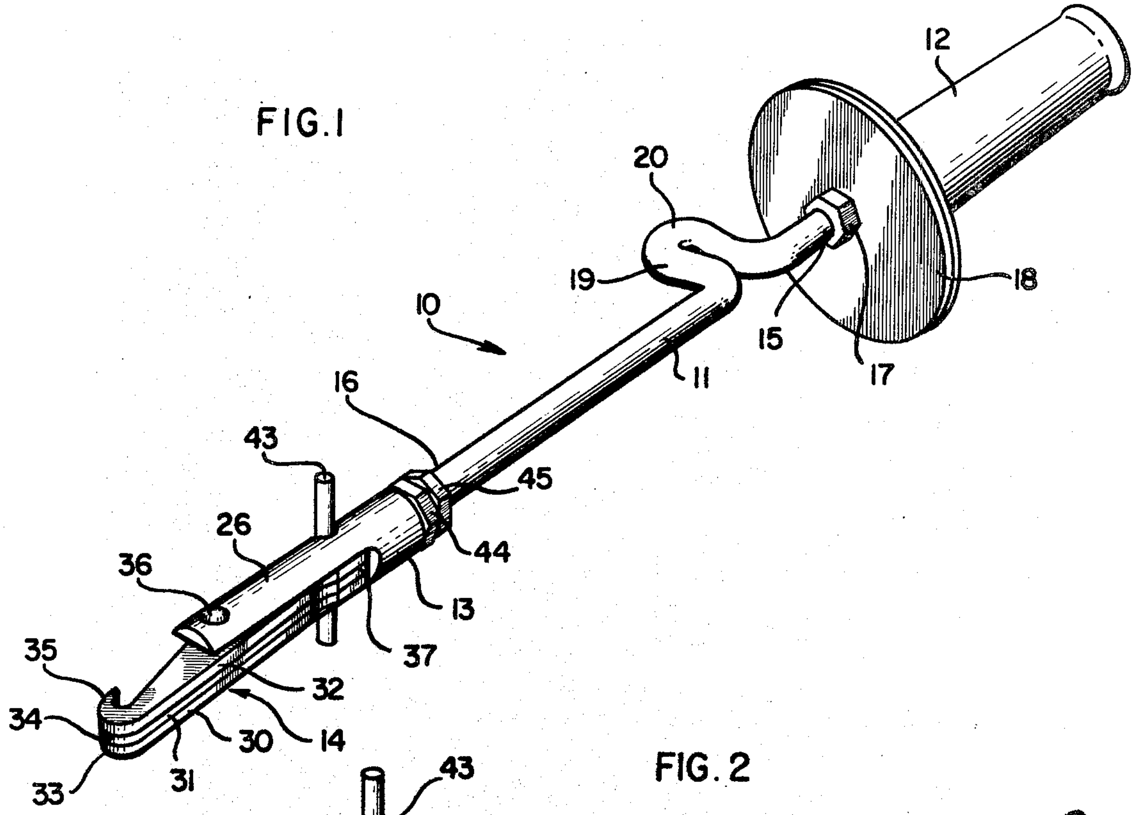
FIG. 1 is a perspective view of a seal pulling tool embodying the present invention.
Figure 2:
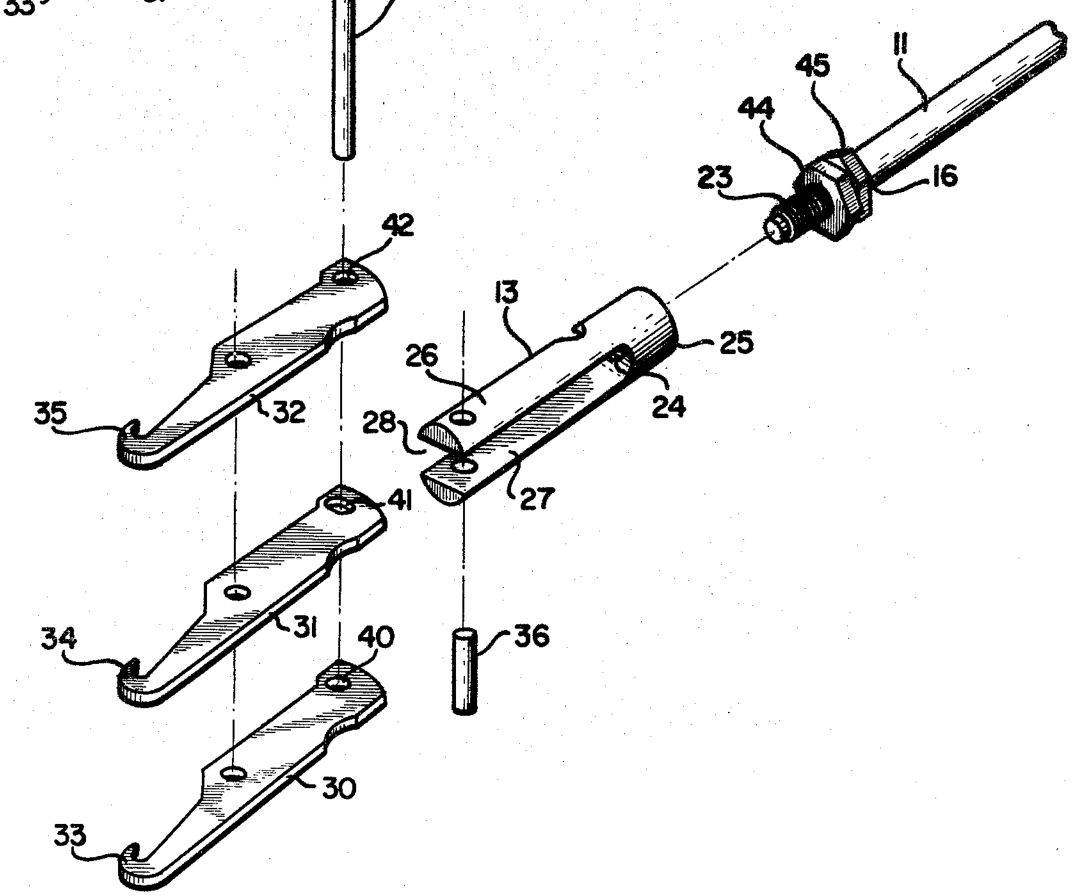
FIG. 2 is a partial, perspective exploded view of the seal pulling tool of FIG. 1.

A seal pulling tool embodying the present invention is shown in FIGS. 1 and 2. Although the description of the operation of the seal pulling tool will be directed primarily to the removing of a ring-shaped seal from an automobile transmission housing, it of couse can be appreciated by those of ordinary skill in the art that the tool of the present invention is adapted for use in any application where removal of a ring-shaped seal is required.

The seal pulling tool 10 generally includes a main or handle section 11, having a grip handle 12 at one end, and a bifurcated fitting 13 on the opposite end, with a pivotal end member 14 carried by said end fitting 13. As will be discussed in detail, the illustrated embodiment contemplates a tool wherein the fitting 13 is in the form of an accessory or attachment mounted to the end of an impact handle. It should be noted however that, if preferred, the fitting 13 may be fabricated as an integral or unitary portion of the main or handle section 11. Returning now to the illustrated embodiment, the main or handle section 11 is elongated and it includes a first end designated generally 15 and a second end generally 16. Proximate the first end 15 there is provided the grip handle 12. Preferably the first end 15 includes an external thread (not shown) which provides means for mounting the grip handle 12 thereto. Secured proximate the grip handle 12 by a nut 17 is a protective shield in the form of a disc 18. The function of the disc 18 is to protect the operator's or mechanic's hand during the application of impact forces to the tool during removal of the seal, as will be more fully described hereinafter.

As the second end 16 of the main or handle section 11 is mounted the bifurcated fitting 13. The second end 16 includes an external thread portion 23 which is received within a threaded bore 24 at a first end 25 of the bifurcated fitting 13. The opposite end of the fitting 13 includes a pair of extensions or arms 26 and 27 which are spaced apart to define a space 28. The threaded bore 24 extends from the first end 25 and communicates or opens into the space 28 between the extensions 26 and 27.

Disposed within the space 28, and mounted for pivotal movement is the hook or end member 14, which end member is comprised of a plurality of similarly shaped segments 30, 31 and 32. The segments 30, 31 and 32 are of substantially identical outer profile and include hook portions 33, 34 and 35 respectively. In the assembled condition, FIG. 1, the segments are arranged in side-by-side, superposed position serving to define the end member 14, and are mounted for joint pivotal movement between extensions 26 and 27 by a pivot pin 36 located intermediate the first end of the pivotal member 14 defined by hooks 33–35 and a second end 37.

Each of the end member segments 30–32 includes an aperture 40–42 proximate the second end 37. The apertures 40–42 are aligned and dimensioned for receiving a pin member 43. Apertures 40 and 42 are dimensioned for a tight force fit with the pin 43 while aperture 41 is somewhat elongate and dimensioned for loosely receiving the pin 43. Accordingly, for a purpose to be explained more fully hereinafter, the intermediate segment 31 is loosely coupled to pin 43, while the outer segments 30 and 32 are tightly or securely coupled to pin 43. More specifically, it can be seen that aperture 41 is elongated as compared to apertures 40 and 42. Hence, the inner or intermediate segment 31 has some limited angular play with respect to outer segments 30 and 32 which provides one significant feature of the invention and will be more fully described subsequently.

Main section 11 also includes intermediate first end 15 and second end 16 a striking or impact surface 19 which is laterally spaced from main section 11 and facing toward the second end 16. The striking or impact surface 19 is advantageously provided by the formation of a substantially U-shaped bend 20 in main section 11. The striking surface 19 is therefore integral to the main section 11.

As can be seen in FIG. 1, the pivotal member 14 is pivotal within a plane extending through the space 28 between extensions 26 and 27. When the pivotal member 44 is in the position as shown in FIGS. 1 or 6, preparatory to importing an impact blow to the tool it is desired to lock said member in place. To accomplish this, the threaded end 23 on the main section 11 is advanced into the bore 24 of fitting 13, until it abuts the end faces 37 of the segments 30–32 which comprise member 14. This engagement precludes pivotal movement and locks member 14 in position. In use of the tool, it is most advantageous to align the striking surface 19 with the plane in which the pivotal member 14 pivots. To this end, the threaded end 23 of the main section 11 further carries a pair of nuts 44 and 45. These nuts 44 and 45 are provided to permit the main section 11 to be oriented with respect to fitting 13 to insure that the striking surface 19 will be aligned with the pivotal plane for member 14 when said member is locked in position.

Figures 3, 4:
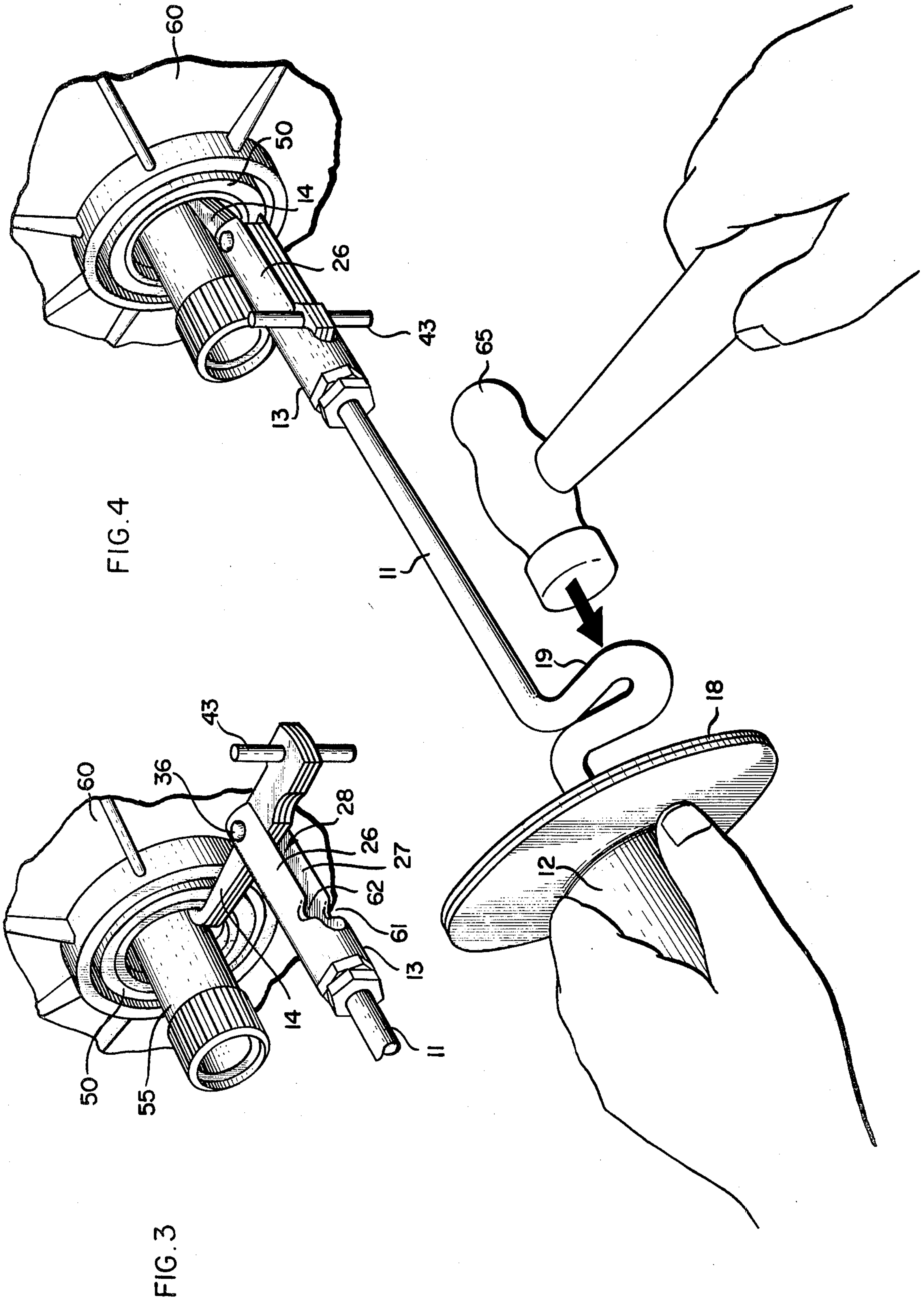
FIG. 3 is a partial, perspective view illustrating the manner of engaging the seal pulling tool of FIG. 1 with a ring-shaped seal to be removed.
FIG. 4 is a partial perspective view illustrating the manner in which a ring-shaped seal is removed by the seal pulling tool of FIG. 1.

Referring now to FIGS. 3 and 4, these illustrate how the tool of FIG. 1 may be operated for removing a ring-shaped seal 50 from an automobile transmission housing 60. It should be noted that the specific operation of the tool with respect to removal seal is shown in greater detail and will be discussed more completely with respect to FIGS. 5–11. It is believed, however, that a general discussion and understanding of the method employed in using the tool of the present invention to remove a seal 50 will facilitate understanding and appreciation of the novel aspects of the present invention.

Briefly, the end member 14 is initially freed for pivotal movement and is positioned as shown in FIGS. 3 and 5, and then the hook shaped end portions 33–35 of the member 14 is engaged with the seal 50. The pivotal mounting of the end member 14, and its relatively short length enables the mechanic to attain this engagement even though the space about the seal 50 is confined by other elements (not shown) of the automobile chassis. It should be noted, that in practice the shaft 55 extending from housing 60 will have a sleeve (not shown) disposed thereon, against which the seal 50 engages. Preparatory to the pulling of the seal 50, this sleeve is removed thus providing a slight clearance between the seal 50 and shaft 55.

Once the hook shaped portion of member 14 is initially engaged with the seal 50, the mechanic can by use of the handle provided by pin 43, pivot the member 14 to the position of FIG. 4 wherein said member is aligned with the main section 11 and disposed within the space 28. As will be explained more fully relative to FIGS. 8–11, this pivotal movement causes the hook shaped portion 33–35 on member 14 to rock upon the shaft 55 while moving inwardly of the seal housing to bring the end faces or end surfaces of the hook shaped portions into engagement with the inner wall of the seal housing, FIG. 10. With the end member 14 in position, the handle or main section 11 is advanced relative to the fitting 13, to bring the end face 29 of the threaded portion 23 into engagement with the end surface 37 of the pivotal member 14, as shown in FIG. 6, to lock said member 14 in position.

As mentioned previously, proper usage of the adjustment nuts 44 and 45 will insure that when the end member 14 is locked in position, the impact surface 19 is aligned with the pivotal plane of said member 14, and thus is easily accessible to the mechanic. The mechanic can now strike the impact surface 19 with a hammer 65, with the force imparted being transmitted to the seal 50 and directed to remove or drive the seal 50 out of the housing 60.

FIG. 7 shows the condition of the housing 60 and seal 50 prior to engagement of the tool, with the seal 50 mounted within a bore 61 by a force fit. The seal 50 includes a housing 51 formed from thin sheet metal and having a turned-in flange 52 defining an inner surface 53. A resilient, elastomeric seal member 54 circumscribes and is carried by the internal periphery of the flange 52 and provides the fluid seal during normal use of the transmission. A sleeve (not shown) is customarily fitted over the shaft 55 and rotates with the shaft. The sleeve has been removed for clarity, and it will be noted that with the sleeve removed, an annular space 56 results through which the hook means of the tool is inserted.

Prior to the present invention, tools have been used to remove ring-shaped seals which have included a relatively thin hook shaped portion at one end. The hook shaped portion was required to be thin so that said portion could be inserted between the shaft 55 and seal 50 through the annular space 56. More specifically, the tool had to be positioned with the plane of the hook disposed longitudinally of the axis of the shaft 55, that is in a position disposed 90° from its customary operating position. After the tool end portion was passed through the annular space 56 interiorly of the housing, it was rotated 90° in effect to align the plane of the hook in a radial or transverse orientation relative to the shaft 55, with the end face of the hook engaging the inner surface 53 of the flange 52. Due to the limited extent of the space 56 it was necessary that the hook portion be relatively thin. Correspondingly, the end face of the hook portion presented an extremely small surface area for engagement with the housing, and in many instances the end face was actually pointed to facilitate initial positioning of the tool. When an impact blow was struck, the force transmitted to the seal housing was thus applied only over the relatively small area of engagement of the hook portion end face with the housing. This created a concentration of stress, or high stress per unit area, and resulted in a tendency for the hook portion to rip through or rupture the relatively thin sheet metal material of the seal housing, rather than effecting the desired removal of the seal.

In direct contrast to the prior art tools and their inherent disadvantages, the seal removing tool of the present invention includes a relatively broad hook member end surface by virtue of the plurality of segments comprising the pivotal member 14. The provision of relatively broad end surface for the hook portion of the tool of the present invention is made possible by virtue of several factors; namely, the pivotal mounting of the end member 14, and also the use of a segmented construction for said end member 14. As can be seen in FIGS. 3, 5 and 8, when the end member 14 is placed in its initial position substantially perpendicular to the extensions 26 and 27 or the main section 11, the hook end portion 30–32 is allowed to engage the seal 50 through the annular space 56. The movement of the end member 14 to attain this initial engagement is shown by comparison of the phantom outline with the full line outline of the end member 14, wherein it can be appreciated that the hook portion 33–35 is in effect rocked upon the shaft 55. After the hook portion 30–32 of the member 14 is engaged with the seal 50, to the extent shown in FIG. 8, the mechanic can pivot said member 14 to its second position substantially in line with the main section 11, as shown in FIG. 4.

Figure 9:
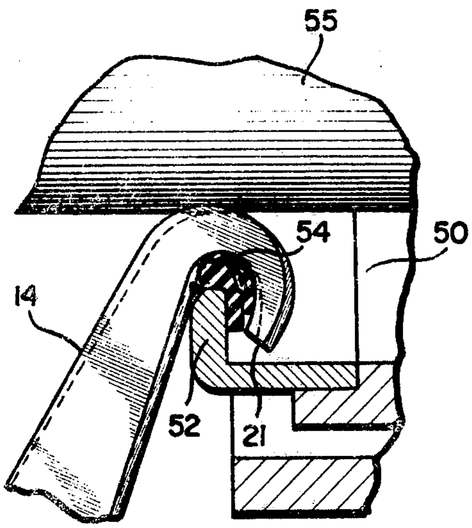
Figure 10:
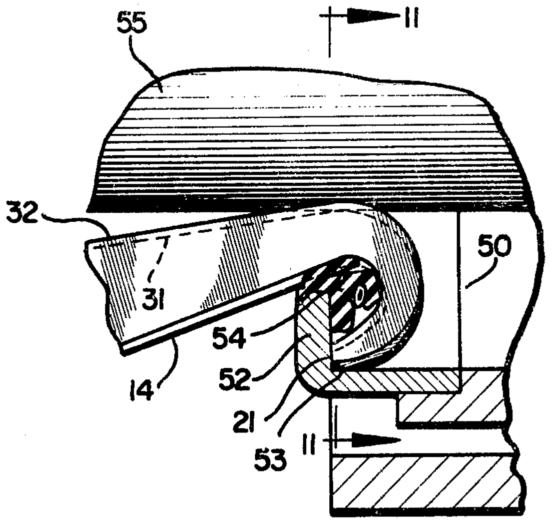

FIGS. 9 and 10, illustrate movement of the pivotal member 14 and the hook portion 30–32 toward said second position. In this regard, the hook portions 33–35 continue to rock on the shaft 55 and around the flange 52 of the seal 50 to compress the resilient seal member 54. When the pivotal member 14 reaches the said second position, FIG. 10, the end surface provided by the hook portion 30–32, and designated generally 21 will be disposed in flush engagement with the inner surface 53 of the turned-in flange 52 of the seal 50.

Due to the relatively broad surface contact between the hook portion end surface 21 of the pivotal member 14 and the seal housing wall 53, the force transmitted to the seal is disposed over a relatively large area. As such, the force created upon striking the impact surface 19 will tend to drive the seal 50 outwardly from the housing bore 61, with the possibility of the tool end member ripping through or rupturing the sheet metal housing of the seal being substantially reduced, with respect to the prior art design discussed above.

Referring again to FIG. 3, it can be seen that the extensions 26 and 27 of the bifurcated fitting include a pair of recesses 61 and 62 which are aligned with one another. These recessed 61 and 62 are positioned and dimensioned so as to receive the pin 43, and permit the pivotal member 14 to attain a position of substantial alignment with the main section 11. The pin 43 not only affords a handle for manipulating the tool, but also provides a stop means by which the pivotal movement of the pivotal member 14 is limited upon engagement of the pin 43 within the recesses 61 and 62. As can be seen in FIG. 6, the ends 37 of the segments 30–32 which make up the pivotal member 14, are formed to a slight curvature to facilitate smooth operation of the tool.

Figure 11:
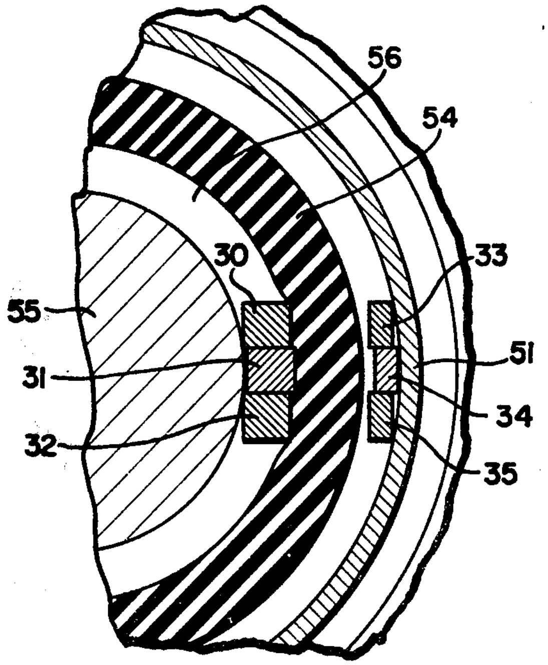
FIG. 11 is a partial sectional view through the seal and the end member of the tool taken along the lines 11—11 of FIG. 10.

It will be recalled that, as shown in FIG. 2, the aperture 41 in the intermediate segment 31 is elongated as compared to apertures 40 and 42 in the segments 30 and 32 to provide a loose or lost motion type of coupling between segment 31 and the pin 43. Also, as previously mentioned this affords slight angular play or movement of the intermediate segment 31 in relation to outer segments 32 and 30. This angular play or displacement of segment 31 provides a distinct advantage in that it permits the hook portion 33–35 of the pivotal member 14 to conform to the arcuate contour of the shaft 55 and the ring-shaped seal 50. Specifically, referring to FIGS. 9–11 as the segmented end member 14 rocks upon the outer, arcuate surface of shaft 55, the intermediate segment 31 move relative to the outer segments 30 and 32 enabling the articulated segments to adapt to the shaft curvature. This relative movement is shown in FIGS. 9–11, and has been exaggerated slighted for purposes of illustration. The articulated design of the member 14 enables the above-discussed pivotal mode of movement to be obtained with a relatively broad hook portion 33–35, taking into account the limited space available. Further, it can be seen that once the pivotal member 14 reaches its second position, the hook structure 34 of segment 31, as shown in FIG. 11, will be slightly displaced from the hook structures 33 and 35 of the segments 30 and 32 respectively. This permits the hook portion 33–35 to conform to the arcuate contour of the housing portion 51 and most importantly enables the end faces or surfaces 21 of the respective hook portions 33–35 to be brought into flush, surface-to-surface contact with the housing wall surface 53, as shown in FIG. 10. This assures firm engagement between the hook structure and the seal, and that the force imparted to the seal housing by the member 14 will be distributed over a relatively large area, which precludes undesired, premature rupture of the flange during removal.

The desirability of providing for force application over a relatively large area, and the attainment of this by the present invention is an important factor in the effective operation of the tool. In this regard, if the hook portion end faces 21 are canted or tipped relative to the seal housing surface 53, the initial application of force will be over a small area, being applied only by the edge of the surfaces 21 in actual engagement. This can lead to initial fracture of the metal, and premature rupture before the seal is removed.

Figure 12:
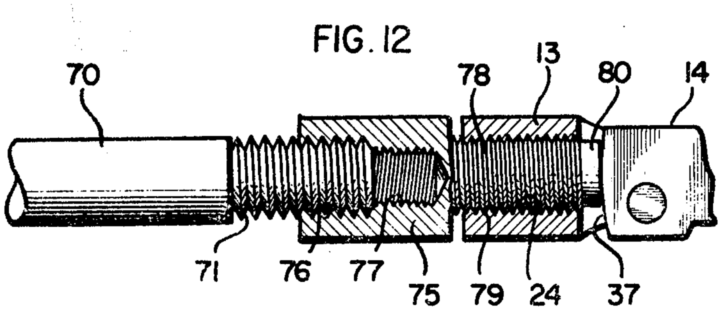
FIG. 12 is a partial side view, partially in cross-section, illustrating an adaptor which may be utilized for mounting the seal pulling tool accessory onto a common tool shaft.

Referring now to FIG. 12, the bifurcated fitting 13 and its pivotal member 14 are shown in conjunction with an adaptor 75 enabling said fitting 13 to be employed with a standard impact tool 70. The tool 70 may be of the type which incorporates a slide hammer (not shown) which are of a type well known in the art, and possessed by mechanics. The standard impact tool 70 normally includes a relatively coarse thread 71 on the end thereof. This type of thread is not compatable with the fitting or tool accessory 13, as a fine machine thread is required for the threaded bore 24, in order to attain proper locking of the end member 14 in position. Accordingly, an adaptor 75 may be provided for use with the accessory fitting 13, which adaptor includes a first coarsely threaded bore 76 for receiving the threaded end 71 of a standard impact tool 70. For additional versatility a threaded counter bore 77 may also be provided for engagement with tools having a mating end portion. Hence, the adaptor 75 is mountable on the tool 70 by merely threading the adaptor 75 onto the threaded end 71. The adaptor 75 also includes an axial extension 78 which has a fine external machine thread 79 thereon corresponding to the internal thread of the threaded bore 24 of the accessory or fitting 13. Extension 78 also provides an end surface 80 which is similar to the second end 16 of the main section 11 of the tool previously described for abutting the ends 37 of the pivotal member 14 to lock the same in its second position during use.

By virtue of the adaptor 75, the bifurcated fitting or accessory 13 and its pivotal member 14 may be employed with most any pre-existing shafted tool for use in removing ring-shaped seals in accordance with the embodiment previously described. This renders the seal removing tool of the present invention extremely flexible for use in conjunction with wide varieties of shafted tools.

From the foregoing, it is believed clear and can be appreciated that the present invention provides a new and improved seal pulling and removing tool, which overcomes and eliminates many of the problems inherent with prior art designs. While particular embodiments of the present invention have been shown and described, it is envisioned that numerous modifications may be made, to the disclosed embodiments, without departing from the spirit and scope of the invention; and it is therefore intended that the appended claims cover and encompass all such changes and modifications which fall within the true spirit and scope of the invention.

The invention is claimed as follows:

1. A tool for pulling and removing ring-shaped seals from an automobile transmission housing or the like comprising: an elongated body means having first and second ends, and a hook member pivotally mounted proximate said second end, said hook member including an elongate portion with hook means at one end thereof which hook means includes a broad relatively flat end surface portion, and said hook member being adapted to pivot with respect to said body means from a first position substantially perpendicular to said body means to a second position substantially in line with said body means to thereby provide a means by which said hook means may engage the seal when said hook member is in said first position and wrap around the seal as said hook member is pivoted from said first position to said second position, such that said broad relative flat end surface portion will engage said seal whereby upon the application of force to said body means as required in removing said seal, said force will be applied over a relatively large area, and the danger of rupturing said seal before removal is completed is lessened.

2. A tool as defined in claim 1, wherein said body means is a fitting, said fitting adapted to be mounted to a main section having a first end with grip means thereon, and a second end upon which said fitting is mounted.

3. A tool as defined in claim 2 wherein said hook member includes a stop means arranged to engage said fitting when said hook member reaches said second position.

4. A tool as defined in claim 3 wherein said stop means comprises a pin extending through said hook member, said pin providing a handle for manipulating said hook member.

5. A tool as defined in claim 4 wherein said fitting includes recess means dimensioned for receiving said stop means pin and wherein said pin is engaged within said recess means when said hook member is in said second position.

6. A tool as defined in claim 2, said main section further including a striking surface facing towards said second end.

7. A tool as defined in claim 6 wherein said striking surface is integral to said main section.

8. A tool as defined in claim 7 wherein said main section includes a reverse bent portion intermediate said first and second ends forming said integral striking surface.

9. A tool as defined in claim 6 wherein said hook member is arranged to pivot in a predetermined plane, and wherein said tool further comprises means for aligning said striking surface with said predetermined plane.

10. A tool as defined in claim 9 further including means for maintaining said striking surface and said predetermined plane in alignment.

11. A tool as defined in claim 1 further including means for locking said hook member in said second position.

12. A tool as defined in claim 2 wherein said main section second end is arranged to engage said said hook member to provide locking means for locking said hook member in said second position.

13. A tool as defined in claim 12 wherein said main section second end includes an external thread, wherein said fitting includes a threaded bore, and wherein said main section second end is threaded into said fitting bore and arranged to engage said hook member and lock same in said second position.

14. A tool as defined in claim 1 wherein said hook member comprises a plurality of similarly shaped segments arranged in side-by-side juxtaposed relation, with the individual segments providing the end surface of said hook means of substantial width.

15. A tool as defined in claim 14 wherein one of said hook member segments is arranged to be slightly angularly displaced from the other said segments, such that when said hook member is in said second position said hook means end surface will conform to the arcuate contour of the seal ring to be removed as well as the contour of any shaft extending from said housing.

16. A tool as defined in claim 15 further comprising a stop means carried by said hook member and arranged to limit the pivotal movement of said hook member towards said second position, said stop means being loosely coupled to said one segment and rigidly coupled to the other said segments to allow said hook means end surface to conform to said arcuate contours.

17. A tool as defined in claim 16 wherein said hook member segments comprises three segments and wherein the center one of said segments is loosely coupled to said stop means.

18. An impact type tool member, or the like, comprising an elongate shank having a handle portion at one end thereof, and operating means at the opposite end thereof, and a reverse bent portion disposed intermediate the opposite ends of said shank, said reverse bent portion providing an impact surface, whereby said tool member may be engaged by a hammer or the like to apply an impact force to said tool member and its operating means.

19. An impact type tool member according to claim 18, wherein said operating means includes a threaded end portion by which an accessory tool or the like may be mounted to said tool member.

20. An impact type tool member according to claim 18, wherein said operating means includes a fitting including a pivotally mounted, hook-shaped member for pulling a seal or the like.

21. An impact type tool member according to claim 18, further including an enlarged annular guard disposed intermediate said reverse bent portion and said handle portion.

22. A tool for removing ring-shaped seals, or the like, such as employed in an automobile housing and surrounding a shaft, extending from said housing, said tool comprising, a pivotally mounted hook member assembly with hook means on the free end thereof, and body means upon which said hook member assembly is mounted, said assembly being adapted to pivot from a first position generally transverse to said body means to a second position substantially in alignment with said body means while said hook means is engaged internally of said seal preparatory to the application of an axial force to said body means to remove the seal, said hook member assembly comprising a plurality of similar shaped segments arranged in side-by-side juxtaposed relation and cooperating to provide said elongate portion and said hook means, with said hook means having an end surface of substantial width, such that during the seal removal operation, said end surface will engage the seal and apply force thereto over expanded area thereby lessening the danger of rupturing the seal during removal.

23. A tool according to claim 22 wherein said segments defining said hook member assembly are mounted for relative movement to accommodate the arcuate shape of the seal and the shaft about which the seal is disposed.

24. A tool as defined in claim 22 wherein said pivotal hook member segments comprise three segments, wherein the center one of said segments is movable relative to the outer segments for allowing said hook means structure to conform to the arcuate shape of the seal or the shaft during engagement of the hook means preparatory to pulling of the seal.

25. A tool as defined in claim 22 wherein said body means is a fitting, and said fitting is mounted to a main section.

26. A tool as defined in claim 25 wherein said main section includes grip means at the end opposite that to which said fitting is mounted, with an internal striking surface formed on said main body section intermediate said grip means and said hook member assembly.

27. A tool as defined in claim 22, further including means to lock the segments of said hook member assembly in said second position.

28. A tool as defined in claim 27 wherein said body means is a fitting engaged upon an end of a main section, said fitting having an internally threaded through bore in which the externally threaded end of the main section is engaged, said externally threaded end of the main section being adapted to extend into abutting engagement with said segments to lock said segments in said second position.

29. A tool according to claim 22 wherein the end surface of said individual segments is substantially flat.

30. A tool according to claim 22 wherein said pivot for the hook member is disposed in relation to said hook means such that when force is applied to said tool to remove a seal, said hook member will tend to pivot to said second position.

31. A tool according to claim 22 further including handle means for manipulating said pivotal hook member assembly, which handle also provides stop means to engage said body means when said assembly is in said second position.

* * * * *